United States Patent [19]

Hammel

[11] Patent Number: 4,853,001

[45] Date of Patent: Aug. 1, 1989

[54] POROUS INORGANIC SILICEOUS-CONTAINING GAS ENRICHING MATERIAL AND PROCESS OF MANUFACTURE AND USE

[75] Inventor: Joseph J. Hammel, Pittsburgh, Pa.

[73] Assignee: PPG Industries, Inc., Pittsburgh, Pa.

[21] Appl. No.: 127,352

[22] Filed: Dec. 1, 1987

Related U.S. Application Data

[63] Continuation-in-part of Ser. No. 872,342, Jun. 6, 1986, abandoned.

[51] Int. Cl.$^4$ ............................................. B01D 53/22
[52] U.S. Cl. .......................................... 55/16; 55/68; 55/158; 65/5; 65/31
[58] Field of Search .................... 55/16, 158, 68; 65/5, 65/31

[56] References Cited

U.S. PATENT DOCUMENTS

| | | |
|---|---|---|
| 2,106,744 | 2/1938 | Hood et al. . |
| 2,215,039 | 9/1940 | Hood et al. . |
| 2,221,709 | 11/1940 | Hood et al. . |
| 2,286,275 | 6/1942 | Hood et al. . |
| 2,461,841 | 2/1949 | Nordberg ............................. 106/50 |
| 2,491,761 | 12/1949 | Parker et al. ......................... 65/4.4 |
| 2,494,259 | 1/1950 | Nordberg ............................. 501/35 |
| 2,500,092 | 3/1950 | Parker et al. . |
| 2,635,390 | 4/1953 | Parker ................................... 65/4.4 |
| 2,843,461 | 7/1958 | Labino .................................. 65/3.1 |
| 3,019,853 | 2/1962 | Kohman et al. ...................... 55/16 |
| 3,022,858 | 2/1962 | Tillyer et al. ......................... 55/16 |
| 3,100,868 | 8/1963 | McAfee, Jr. ....................... 55/16 X |
| 3,135,591 | 6/1984 | Jones ................................. 55/158 X |
| 3,184,899 | 5/1965 | Frazier ................................. 55/16 |
| 3,258,896 | 7/1966 | Müller .................................. 55/16 |
| 3,262,251 | 7/1966 | Hicks, Jr. ............................. 55/158 |
| 3,269,817 | 8/1966 | Bondley ............................. 55/16 X |
| 3,279,902 | 10/1966 | Gardner ............................. 55/16 X |
| 3,294,504 | 12/1966 | Hicks, Jr. ........................... 55/16 X |
| 3,416,953 | 12/1968 | Gutzeit et al. ........................ 65/3.4 |
| 3,511,031 | 5/1970 | Ketteringham et al. ........... 55/16 X |
| 3,549,524 | 12/1970 | Haller ................................ 55/386 X |
| 3,567,666 | 3/1971 | Berger ................................ 55/158 X |
| 3,570,673 | 3/1971 | Dutz et al. ....................... 55/386 X |

(List continued on next page.)

FOREIGN PATENT DOCUMENTS

| | | |
|---|---|---|
| 186128 | 7/1986 | European Pat. Off. . |
| 186129 | 7/1986 | European Pat. Off. . |
| 188811 | 7/1986 | European Pat. Off. . |
| 159502 | 10/1982 | Japan ............................. 210/500.23 |
| 886043 | 1/1962 | United Kingdom ................. 55/16 |
| 1271811 | 4/1972 | United Kingdom . |

OTHER PUBLICATIONS

Elmer, "Leaching of E-Glass", J. of American Ceramic Society, vol. 67, No. 12, Dec. 1984, pp. 778-782.

(List continued on next page.)

*Primary Examiner*—Robert Spitzer
*Attorney, Agent, or Firm*—Kenneth J. Stachel

[57] ABSTRACT

A hollow, porous, silica-rich fiber and a process for separating at least one gas from a gaseous mixture utilizing the hollow, porous, silica-rich fiber result in gas separations with good permeability and good selectivity. The hollow, porous, silica-rich fiber is non-crystalline and has pore sizes having a range of 1 to around 50 Angstroms in diameter and a mean pore size of around 5 to 50 Angstroms in diameter and a filament diameter in the range of 1 to around 250 microns and wall thickness in the range of around 1 to 50 microns. The hollow, porous, silica-rich fibers with a fine pore structure and thin walls are produced by forming hollow glass fibers by attenuation from melt at speeds in the range of 500 ft/min to around 30,000 ft/min and having a non-phase-separated glass composition selected from: a non-phase separable fiberizable glass composition, a phase separable borosilicate having one or more oxides of a metal from Group IVB of the Periodic Table, a phase-separable glass composition with an amount of boron oxide of around 5 weight percent up to around 60 weight percent, and alkali metal oxide silicate glass compositions. The non-heat treated glass fibers are leached to extract acid and/or water soluble components. At least one hollow, porous, silica-rich fiber is used in a device suitable to contain a gaseous mixture and the permeate is withdrawn from the glass fiber from the opposite side from that at which the gaseous mixture contacts the hollow, porous fiber.

39 Claims, 1 Drawing Sheet

U.S. PATENT DOCUMENTS

| | | | |
|---|---|---|---|
| 3,650,721 | 3/1972 | Hammel et al. | 65/2 X |
| 3,817,764 | 6/1974 | Wolf | 501/38 |
| 3,843,341 | 10/1974 | Hammel et al. | 65/22 |
| 3,923,533 | 12/1975 | Hammel et al. | 106/40 X |
| 3,923,688 | 12/1975 | Hammel et al. | 106/40 X |
| 3,966,481 | 6/1976 | Atkinson et al. | 501/38 |
| 3,972,720 | 8/1976 | Hammel et al. | 106/54 |
| 3,972,721 | 8/1976 | Hammel et al. | 106/54 X |
| 4,042,359 | 8/1977 | Schnabel et al. | 65/2 |
| 4,084,977 | 4/1978 | Freedman | 501/38 |
| 4,482,360 | 11/1984 | Taketomo et al. | 55/16 |
| 4,583,996 | 4/1986 | Sakata et al. | 55/16 |

OTHER PUBLICATIONS

Kosting et al., "Gas Permeability of Microporous Glass Membranes", Stekio i Keramika, No. 7, Jul. 1982, pp. 14–15.

Bahat et al., "Hollow Fiber Glass Membrane", J. of Applied Polymer Science, Applied Polymer Symposium, 31, 1977, pp. 389–395.

Kameyama et al., "Differential Permeation of Hydrogen Sulfide through a Microporous Vycor-type Glass Membrane . . . ", Separation Sc. & Tech., 14 (10), 1979, pp. 953–957.

McMillan et al., "Microporous Glasses for Reverse Osmosis", J. of Materials Science 11 (1976) pp. 1187–1199.

Kammermeyer et al., "Effect of Adsorption in Barrier Separation", Industrial Engineering Chemistry, vol. 50, No. 9, Sep. 1958, pp. 1309–1310.

Huckins et al., "The Separation of Gases by Means of Porous Membranes", Chemical Engineering Progress, 49 (4) Apr. 1953, pp. 180–184.

Shindo et al., "Possibility of Adjustment of $H_2$/CO ratio in Synthesis Gas by Means of Porous Glass Membranes", Int. J. Hydrogen Energy, vol. 10, No. 1, 1985, pp. 27–30.

Shindo et al., "Gas Diffusion in Microporus Media in Knudsen's Regime", J. Chem. Eng. of Japan, vol. 16, No. 2, 1983, pp. 120–126.

Tsujikawa et al., "Separation of Benzene & Nitrogen by Permeation through Porous Vycor Glass", Kagaku Kogaku Ronbunshu, 11 (5), 1985, pp. 534–541.

Scherer et al., "Stressin Leached Phase-Separated Glass", J. of the American Ceramic Society, vol. 68, No. 8, Aug. 1985, pp. 419–426.

McAfee, Jr., "Helium and Diffusion Separation", Bell Laboratories Record, vol. 39, Oct. 1961, pp. 354–358.

Lee et al., "The Transport of Condensible Vapors Through a Microporous Vycor Glass Membrane", J. Colloid & Interface Science, vol. 110, No. 2, 4/1986, pp. 544–555.

Hwang et al., "Surface Diffusion in Microporous Media", The Canadian Journel of Chem. Eng., Apr. 1966, pp. 82–89.

Shindo et al., "Separation of Gases by means of a Porous Glass Membrane at High Temperatures", J. of Chem. Eng. of Japan, vol. 17, No. 6, 1984, pp. 650–652.

Bledzki et al., "Corrosion Phenomena in Glass Fibers and Glass Fiber Reinforced Thermosetting Resins", Composites Science & Technology 23 (1985) pp. 263–285.

"Porous, Melt-Molded Boric Silica Glass Filters", An Original Developement of the Government Industrial Research Institute, Osaka; p. 13.

"Research on Porous Glass Membranes for Reverse Osmosis", Stanford Research Institute Library, Irvine, CA 92644, Final Report, pp. 45–49 and 54.

Product Brochure entitled, "Fuji Porous Glass Filter" from Fuji Filter.

61-204006, 9/10/86, Japan, Abstract only!

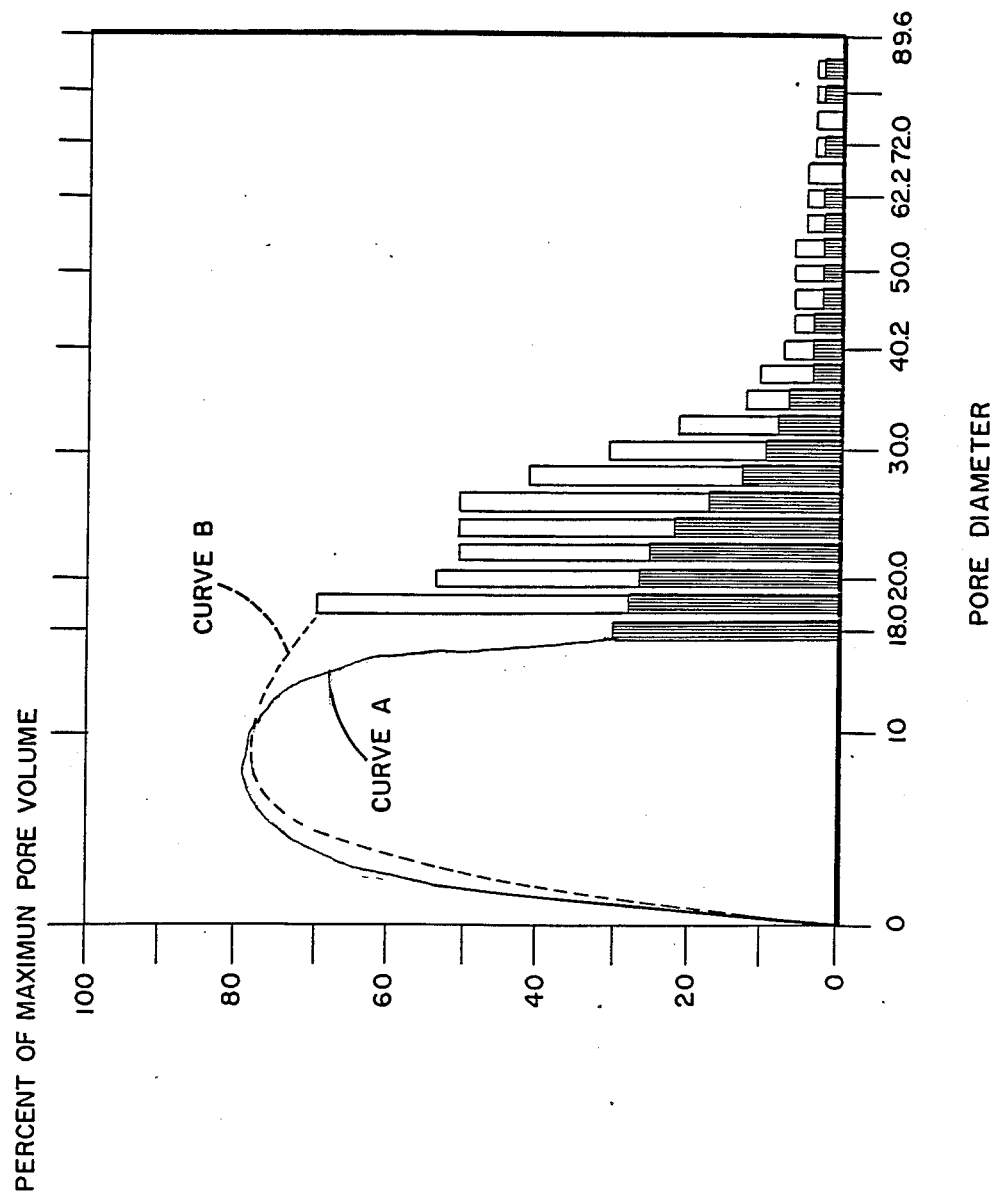

POROUS INORGANIC SILICEOUS-CONTAINING GAS ENRICHING MATERIAL AND PROCESS OF MANUFACTURE AND USE

This application is a continuation-in-part patent application of Ser. No. 872,342 filed June 6, 1986, now abandoned.

The present invention is directed to a porous, siliceous-containing material for separating or enriching one gas or condensible vapor from one or more other gases and/or condensible vapors in a gaseous mixture and the processes of making and using the porous material.

Sundry types of membranes enable the separation of one gas or condensible vapor from one or more other gases and/or vapors in a gas mixture. These types of membranes include: polymer membranes, glass membranes, and composite or multicomponent membranes. The application of these membranes to separating gases addresses the need to enrich, separate, or isolate one gas from another in areas such as: chemical processing, petroleum processing, oxygen replenishing or carbon dioxide removal from air in sealed vehicles such as airplanes, space vehicles and submarines.

One example of the usefulness of separation or enriching membranes in the chemical process industry is the separation of helium from methane. Helium is not present in nature in pure form but only as a component of gaseous mixtures, as in natural gas. Also helium occurs in by-product gas mixtures resulting from various chemical processes and/or treatments. The most widely used commercial process for separating helium from natural gas involves low temperature fractionation. Since helium is normally found in natural gas in concentrations of around 400 parts per million to 8 volume percent of natural gas, this separation process requires cooling of extremely large quantities of gas to temperatures low enough to liquify all of the gases except helium. The size of such a plant and the expensive equipment involved provides an impetus for utilizing membranes to separate helium from methane. Other examples in the area of chemical or petroleum processing include: removal of acid gases from fuel gas sources and synthesis gas in the area of gasification of fossil fuels, separation of carbon dioxide in the presence of acid gases (secondary oil recovery), oxygen separations from chlorine in chlorine production. Also the membranes find application in gas analysis by their incorporation into analytical gas analyzing instruments.

Materials that are candidates for membranes must meet both physical and chemical requirements as well as yielding good membrane requirements. The physical property requirements include: good performance in the areas of tensile strength, tear strength, abrasion resistance, flexibility, dimensional stability for a wide range of thermal and chemical conditions, stress crack resistance, strength to withstand compaction in high-pressure utilization, good toughness and morphological stability for a reasonable period of time. Some chemical property requirements involve good performance in such areas as stability to withstand temperature fluctuations, chemical resistance, and maintenance of morphology and microstructure even under severe pressure changes. In addition, the materials should exhibit good membrane properties of selectivity with adequate permeability. The right combination of permeability and selective separation and the thinnest possible form available embodies a membrane that would be useful in the gas enrichment of separation areas.

The glass membranes in the form of porous thimbles in multicomponent membranes proved useful in the gas separation of: hydrogen from hydrogen sulfide, the helium from methane. Researchers at the National Chemical Laboratory for Industry in Japan reported the separation of a helium and carbon dioxide gas mixture by means of a porous glass membrane in the form of a thimble utilizing concurrent flow in a temperature range of 296 to 947° C. (564.8°–1,736.6° F.). Researchers at the State Scientific-Research Institute of Glass; State Scientific-Research Institute of the Nitrogen Industry in the Soviet Union reported silica-rich highly porous glasses, approximately 96% $SiO_2$ in the form of microporous glass tubes were useful as semi-permeable membranes. In this work, the unchanging permeability coefficient in numerous experiments indicated the free-molecule character of the gas flow through the glass. Also it has been shown that the high-purity, nonporous silica glass membranes can purify helium from natural gas and other sources sine this smallest of gas molecules (2 Angstrom) can pass through the membrane via defects in the glass structure. German researchers (British Patent No. 1,271,811) utilizing a porous substrate with a nonporous glass glazing were successful in separating helium from methane. In the aforementioned work with porous high-silica containing glasses, heat treatable borosilicate glass compositions were used which are known as "Vycor" glass compositions available from Corning Glass Works. This composition has an amount of boron oxide in the range of about 20 to 35 weight percent and an amount of soda of 4 to 12 weight percent with the balance being silica. These glass compositions are phase separable upon heat treatment and are leachable to remove a majority of the boron oxide and alkali metal oxides to leave around 96 weight percent silica-rich material.

In the area of membranes used for gas enrichment or separation, additional enhancements of this technology await the development of thinner, yet stronger membranes with uses under wider temperature conditions and with improved chemical durability.

SUMMARY OF THE INVENTION

The present invention in its three aspects includes:

a gas separation and/or enrichment material that is at least one porous, silica-rich, hollow, inorganic fiber;

a process of making the gas separation and/or enrichment material;

a process of separating or enriching at least one gas or condensible vapor from a mixture of gases and/or condensible vapors.

The gas separation and/or enrichment material has a particular form and dimensions, composition and fine pore morphology. The form is a hollow and porous fiber having outer diameters in the range of around 1 to around 250 um or micrometers (microns) and wall thicknesses in the range of around less than 1 to around 50 microns. Suitable lengths for the hollow and porous fibers are those that are effective to permit a gaseous and/or vaporous mixture to contact one surface while permitting an enriched gaseous or vaporous stream to be collected at a second opposite surface of the hollow porous fiber. The silica-rich composition of the porous, hollow fibers results from leaching the acid and/or water soluble components of non-phase separated glass fibers of various compositions. The glass fiber compositions range from those that are predominantly single phase like "E-glass" or "621-glass" types of fibers and hindered phase-separable borosilicate compositions containing at least one oxide of the Group IVB of the Periodic Chart of elements to those that are silica-containing compositions with an appreciable amount of about 15 to about 60 weight percent of acid and/or water soluble components selected from: the Group IVB oxides, $P_2O_5$, $Al_2O_3$, $Fe_2O_3$, PbO alkali metal oxides, $SnO_2$, $B_2O_3$ and mixtures thereof with or without alkaline earth metal oxides. The fine pore morphology relates to pores having pore sizes in diameters in the range from around 1 to 50 Angstroms with a predominant percentage of pore volume comprised of average pore diameter of around 25 Angstroms or less. The pore sizes and the average pore size have good uniformity throughout the thin walls of the hollow fibers.

The process of making the hollow, porous fiber membrane involves forming and leaching the formed fibers without any post-formation heat treatment. Formation of the hollow fibers can occur at attenuation rates of around 500 to 30,000 or more feet/min. The fiber issues from a bushing having orifices designed to deliver gas pressures sufficient to give the fiber an inner to outer diameter ratio of around 0.2 to around 0.96 and outer diameters in the range of 1 to around 250 micrometers and a wall thickness of around less than 1 to around 50 micrometers. The glass composition of the hollow fibers is essentially non-phase-separated like single phase or non-phase separated but phase-separable siliceous-containing glass compositions with at least 15 weight percent leachables. The leachables are materials soluble in acids (not including hydrofluoric acid) and/or water soluble materials. The non-heat-treated hollow glass fibers are leached with such acids and/or water to extract those leachable materials. This produces the hollow, porous, silica-rich inorganic fiber membrane.

The process of separating gases and/or condensible vapors involves using the follow and porous fibers so that the gaseous and/or vaporous mixture contacts one side of at least one of the porous, hollow fibers, and enriched or separated gas or vapor (permeate) is removed from the opposite side. If the gaseous mixture contacts the exterior surface of the porous hollow fiber, the lumen or interior surface of the hollow fiber is the opposite side. The gaseous or vaporous mixture is removed from the same side of the porous hollow fiber that it initially contacted. Either the lumen or the exterior surface of the hollow glass fiber can be the side for initial contact by the gaseous mixture. At least one porous hollow fiber is housed in a suitable apparatus to contain the gaseous mixture and to provide for removal of the gaseous mixture at one location and of the permeate from a separate location connected to the opposite side of the porous hollow fiber. The conditions of separating or enriching include: thermodynamic driving forces and a temperature in the range of sub-ambient to elevated temperatures below the softening point of the silica-rich fibers.

BRIEF DESCRIPTION OF THE DRAWING

The FIG. 1 is a graph of incremental pore volume distributions for two samples of hollow porous fibers of the invention. Curve A is of a hollow porous fiber of a non-phase separated but phase separable glass fiber composition. Curve B is of a hollow porous fiber of a non-phase-separated single-phase glass fiber composition.

DETAILED DESCRIPTION OF THE INVENTION

In the following description and in the claims, the following terms have the described meanings.

The term "gas" includes permanent gases that means gases at less than extreme temperatures and pressures, and any condensible vapors, even the less-easily condensed vapors which are condensible at conditions other than those used in feed gas streams to be enriched or separated.

The term "perm selective" means permeable to different extents to different molecular species under equal driving force.

the term "ultrafiltered type" means transport is partially by a porous mechanism but membrane penetrant interactions are also important.

The term "gas separation" means separations ranging from 100 percent separation to enrichment of a gas in any concentration over and above that of the original gaseous mixture.

The term "permeability factor" represents the steady state rate of gas transmission through a membrane. Values for permeability factors are not ordinarily normalized for membrane thickness. For homogenous membranes, the permeability factor is inversely proportional to the sample thickness. When the thickness of the active part of the membrane is not known, e.g., in asymmetric membranes, the permeability factor is still a valid permeability characterization. The permeability factor values determine the value-in-use of the membrane in permeation devices. The derivation of the equation for permeability factor is as follows: the volume of gas transmitted through a membrane is directly proportional to the area, time and pressure of the permeation test as:

Permeability factor = volume divided by area × time × pressure The units selected for volume, area, time and pressure are $cm^3$ (STP), $cm^2$, seconds and cm of mercury, respectively.

The term "separation factor" or "selectivity" for a membrane and for a given gaseous mixture including gases A, B, ... N is defined as the ratio of the permeability constant ($P_a$) of the membrane for gas (A) to the permeability constant ($P_{others}$) of the membrane for the other gases in the mixture. The separation factor is also equal to the ratio of the permeability factor ($P_a$/a) of a membrane of thickness "1" for gas "a" of a gas mixture to the permeability factors of the same membrane to the other gases ($P_{others}$/1) wherein the permeability constant or permeability for a given gas is the volume of gas at standard temperature and pressure (STP) which passes through a membrane per square centimeter of surface area, per second, for a partial pressure drop of 1 centimeter of mercury across the membrane per unit of thickness and is expressed as $P = (cm^3$ multiplied by $cm)/(cm^2$ multiplied by second multiplied by cm mercury). In practice, the separation factor with respect to a given pair of gases in a binary gaseous mixture for a given membrane can be determined by employing numerous techniques which provide sufficient information for calculation of permeability constants or permeability factor for each of the gases in the binary mixture. Several of the many techniques available for determining permeability constants, permeabilities and separation factors are disclosed by the work entitled "Techniques of Chemistry", Vol. VII, Membranes & Separations, by Hwang et al., John Wiley & Sons, 1975, herein incorporated by reference at Chapter 12, pages 296–322.

The terminology "porous separation membrane" relates to membranes, which may have continuous porous channels for gaseous flow that communicate between the interior surface and the exterior surface, or which have numerous fine pores in the range of 1 to 50 Angstroms, where a majority of the pores interconnect. Also the term refers to porous materials, which have numerous pores in the range of 1 to 50 Angstroms, where there may be interconnecting pores for gaseous flow that communicate between the interior surface and the exterior surface. In other words, the membrane has considerable internal void volume related to continuous porosity from one side of the membrane to the other.

The term "selectivity" is defined as the ratio of the rate of passage of the more readily passed component of a gaseous mixture to the rate of passage of the less readily passed components. Selectivity may be obtained directly by contacting a membrane with a known mixture of gases and analyzing the permeate. Alternatively, a first approximation of the selectivity can be obtained by setting up the ratio of the rates of passage of the two or more components determined separately on the same membrane. The rates may be expressed as GcB units (centibarrers as determined from the gas transmission rate).

Permeability can be measured by the variable pressure method or the variable volume method, both methods are well known to those skilled in the art.

The term "non-phase-separated" refers to single-phase glass compositions and to phase-separable glass compositions that can be cooled rapidly enough for given fiber dimensions to prevent phase separation. The non-phase-separated glass composition includes phase-separable glass compositions that would phase-separate upon appropriate heat treatment subsequent to formation (post-formation heat treatment). Generally, non-phase-separated glass compositions are those in which the size of the composition fluctuations are less than the size of a critical nucleus of 20 angstroms. Mechanisms for describing the formation of new phases include the classical nucleation and growth mechanisms. Here, there is a sharp boundary between phases with a measurable interfacial energy and the new stable phase is defined by a critical nucleus size. For glasses, critical nucleus size has been estimated to be larger than 20Å, as shown in "Direct Measurements of Homogeneous Nucleation Rates in a glass-Forming System", J. J. Hammel, Jl. Chem. Physics, Vol. 46, No. 6, pp. 2234–2244 (1967), hereby incorporated by reference. Glasses can also phase separate by a mechanism of "Spinodal Decomposition" in which small fluctuations in composition grow rapidly when the glasses are in the spinodal region of a miscibility gap. Here, initially, there is no sharp boundary or interfacial energy between phases, and the inhomogeneities (or composition fluctuations) are points of maximum concentration of one component that gradually move to maximum concentration of the second component, e.g., $SiO_2$ to $B_2O_3$ in a borosilicate glass. This type of structure is also found above the miscibility gap where there are similar fluctuations in composition even in a single phase glass melt. Therefore, glass structure in the initial stages of spinodal decomposition cannot be distinguished from the structure of a single phase glass. Sharp boundaries with measurable interfacial energies are a necessary requirement for two-phase systems (e.g., phase separated glass). These conditions are not approached in spinodal separating systems until the phases are at least the size of a critical nucleus of around 20 Angstroms. Here, a phase refers to a region that is formed by enlarging regions originally present in the glass fibers. Even in non-phase separated glass, leaching can produce some pores with diameters greater than 20Å because of factors such as inhomogeneities and compositional fluctuations in the glass.

It is believed without limiting the scope of the invention that the porous, hollow, silica-rich fiber membranes of the present invention act as a membrane, where the gaseous separation is due to more than size exclusion and penetrant interactions but also includes interactions with the porous walls to give good permeability and good selectivity.

For a better understanding of the invention, the term "extractable" for a group of components refers to metal oxides and associated materials which are leachable from the glass fibers by water and/or acids other than hydrofluoric acid. Hydrofluoric acid cannot be used since it attacks silica. Also the term "non-extractable" for the group of components refers to silica and metal oxides of Group IV B of the Periodic Chart. These material are not leachable from the glass by acids other than hydroflouric acid. Also the terms "associated material" refers to an interconnected structure of reaction products of the components of the extractable group or the non-extractable group or of the components from both groups because of their proximity to each other in the glass fibers. Nonexclusive examples of associated materials include alkali metal borates, alkali metal aluminates, other interaction products with aluminum oxide and the like.

The porous, hollow, silica-rich fibers of the present invention are prepared from a formulated fiberizable, pore generating, glass forming batch composition. The batch composition is formulated to enable the resulting glass fibers to have a balance of the two groups of components, i.e., the extractable including associated materials and the non-extractable. Typical batch materials known to those skilled in the art can be used and calculated by known methods to produce the glass compositions with the components of the two groups. In the pore generating glass fiber composition, the components and associated materials of the extractable group are present in an amount of at least 15 to around 60 volume percent and include: one or more boron-containing materials; alkali metal oxides ($R_2O$); alkaline earth metal oxides like bivalent oxides (CaO, MgO); trivalent oxides like $Al_2O_3$, and $Fe_2O_3$ and oxides such as $TiO_2$, $SnO_2$, and $P_2O_5$. In addition, trace amounts of materials usually present in trace amounts in glass fibers can also be present like fluorine. The total amount of the components of the extractable group in the glass fibers is preferably at least 30 volume percent of the total glass composition. The presence of the $R_2O$ and/or $B_2O_3$ materials also serve as fluxes in producing the glass fibers.

The components of the non-extractable group include the siliceous material such as silica and any refractory glass modifiers like the tetravalent oxides of zirconium and/or titanium and/or hafnium.

Any phase-separable glass compositions (those that separate into phases upon heat treatment) within the range of the aforelisted compositions having little, if any, refractory glass can be used in the present invention. This includes those having high concentrations of boron-containing materials, i.e., around 5 to around 60 weight percent of the total glass composition. The hindered phase separable glass compositions (those that phase separate upon heat treatment but that contain a refractory glass modifiers) also are useable in the present invention. Both the phase-separable and the hindered phase-separable glass fibers are used in the present invention but in non-phase-separated form.

When the content of boron-containing material is 0 or slightly greater than zero, the amount of alkali metal oxides ($R_2O$) can be a major component in the extractable group. When the amount of boron-containing compound is in the range of less than around 35 weight percent of the total resulting glass composition, one or more of the other aforelisted inorganic oxide components can be present in the extractable group. When the amount of boron-containing material is around 35 weight percent and up to 60 weight percent of the total resulting glass composition, the boron-containing material components constitute the majority and the other inorganic oxide components constitute the minority of the extractable group.

Regarding the other components in the glass fiber that can be considered in the extractable group, the aluminum oxide can be present in an amount in the range of 0 to about 15 weight percent of glass composition. This amount is generally less for higher amounts of boron-containing materials in the glass fibers and larger for lower amounts of boron-containing materials in the glass fibers. The amount of $R_2O$ components range from less than one weight percent up to around 15 weight percent, when higher amounts of boron-containing components are present. Also there can be present, especially with lower amounts of boron-containing components, calcium oxide (CaO) and magnesium oxide (MgO). The total amount of these components can be in the range of 0 to about 30 weight percent of the glass composition.

The amount of siliceous material should not be less than around 30 and preferably not less than 40 weight percent of the total glass composition. Generally, the siliceous material is less than around 80, preferably less than around 70 weight percent of the total glass composition. The metal oxides such as zirconium and/or titanium and/or hafnium can be present in amounts from around 1 to about 20 weight percent of the glass composition. Preferably, zirconium oxide is present in an amount of up to about 8 weight percent. Since these oxides have good acid insolubility, they are present with silica in the porous hollow fiber. These metal oxides not only render porous fibers having better alkaline stability, but also they enable substitution of the tetravalent oxides of zirconium and/or titanium and/or hafnium for one or more of the components of the extractable group. Their presence not only results in controlling porosity (by decreasing porosity without altering the amount of silica), but it also results in more alkaline stable, porous, silica-rich fibers.

A particularly useful glass composition for increased porosity is a phase-separable glass having a low silica and high-borate content. Generally these glasses have amounts in weight percent of silica at 30 to 50 percent by weight, boric oxide at 40 to 55 percent by weight, alkali metal oxide at 5 to 15 percent by weight, aluminum oxide from 0 to 4 weight percent and zirconium oxide about 1 to about 4 weight percent.

The fully phase-separable borosilicate glass compositions include those pioneered by Hood and Nordberg for Corning Glass Company as described in U.S. Pat. Nos. 2,106,744; 2,215,039; 2,221,709; 2,285,275; 2,461,841 and 2,494,259 and the article entitled "Properties of Some Vycor-brand Glasses", M. E. Nordberg, Journal of the American Ceramic Society, Vol. 27, No. 10, pgs. 299-305, all of which are incorporated herein by reference. Generally, the Vycor-brand glass composition has: $B_2O_3$ in an amount of 20-35 weight percent, alkali metal oxide in an amount of 4-12 weight percent and silica in an amount of not less than 56 and not more than 75 weight percent. Also aluminium oxide may be present in an amount of not more than around 12 weight percent.

A suitable aluminum borosilicate - Group IV metal-containing glass fiber composition for generating a lower degree of porosity is the composition like "E-glass" or "621-glass" but with zirconium oxide and/or titanium oxide and/or hafnium oxide. These modified hollow glass fiber compositions have in weight percent: 45-56 silica, 5-13 boric oxide, 10-17 aluminum oxide, 13-24 calcium oxide, 0 to 6 magnesium oxide, 2-6 zirconium oxide, 0 to 6 titanium oxide and/or hafnium oxide along with less than around 1 percent of both fluorine and ferric oxide and $R_2O$. The 621 glass differs from E-glass in the presence of magnesium oxide in the former. The E-glass in the absence of magnesium oxide has an increased amount of calcium oxide. Preferably, the modified 621-glass is modified with zirconium oxide that is substituted for some aluminum oxide. A suitable glass fiber composition in weight percent is: 52-56 silica, 5 to 8 boric oxide, greater than 22 to 24 calcium oxide, less than 12 aluminum oxide, 2-4 zirconium oxide with less than 1 weight percent of each of the following: fluorine, ferric oxide and sodium oxide. The extractable components can be removed from these non-phase-separated glass fiber compositions through acid leaching without any heat treatment. Also the standard "E-glass" and "621-glass" without the refractory glass modifier can be used.

A suitable alkali metal silica glass composition for forming hollow fibers has around 29 weight percent sodium oxide ($Na_2O$), 62 weight percent silica ($SiO_2$), and 9 weight percent zirconium oxide ($ZrO_2$). For these types of glass compositions, the amount of alkali metal oxide $R_2O$ can range from about 20 to about 40 weight percent and the amount of metal oxide of the Group IV metal can range from about 1 to about 20, preferably less than 12 weight percent $ZrO_2$, with the remainder being silica.

The hollow glass fibers are prepared from glass batch compositions melted in a furnace at temperatures and times to obtain a fiberizable viscosity for the molten glass without devitrification. Generally, the batch is heated to 2000° F. (1093° C.) to 3000° F. (1649° C.) for 1 to about 6 hours or longer. The molten glass is attenuated from the orifices of a bushing located on a forehearth connected to the furnace. The bushing has tubes aligned and associated with the orifices and connected to a supply of gas at a superatmospheric pressure to allow for a continuous flow of gas to the vicinity of the orifice. The flow of gas can be uniform to produce continuous glass fibers, or can be intermittent to produce intermittent hollow glass fibers. A further description of the production of hollow and intermittent glass fibers is given for a direct melt system in U.S. Pat. Nos. 3,268,313; 3,421,873 and 3,526,487, all hereby incorporated by reference. As an alternative to melting batch for feeding to the bushings, a marble melt or other type of indirect melt operation can be used.

Preferably, the production of hollow glass fibers of the instant invention results in good concentricity of the central lumen of the fibers for two basic reasons.

First, the bushing tip is firmly affixed to the faceplate of the bushing. The aligned tube through which the gases are introduced to provide the central lumen of the glass fibers as they are being formed is also rigidly affixed to the bushing faceplate through a bracket member which forms a truss that prevents the tube from moving in any direction with respect to the faceplate itself. Thus, any warping of the faceplate during operation and consequent movement of the bushing tips carries with it an associated similar movement of the tube or conduit so that the gas introduced through the gas tube is always being introduced to the molten glass emanating from channels in the bushing tip at the same location. The established lumen of the resulting fibers is thus readily maintained at its formed diameter as is the outside diameter of the fiber. This provides for uniform K values (outer diameter/inner diameter ratio) obtained in the fibers herein produced.

Secondly, it has been found in some cases that by introducing the air stream into the glass at the exit point of the tip and at larger diameter than heretofore used, characteristic bulging of the cone of the molten glass may be avoided. Further, a more stable attenuation process is achieved, and uniform concentric holes are provided in the glass fibers formed as the molten glass emanates from the bushing tip. This occurs because the diameters of the air stream and glass stream at the tip are in approximately the same proportion as the desired end product. Once again, the lumen is centrally located and is constantly in the same position (regardless of whether or not the bushing faceplate distorts) due to the firm connection between the bracket member, the bushing faceplate and the tube. Glass can flow freely into an area above the bushing tips in all instances, where the tubes are being held, since the bracket member is completely open in between the spaces between tabs and also through the holes located in the top of the bracket member. Welds between the tube and the bracket member and the solid connection or button formed by the side arm tabs of the brackets in the hole provided in the faceplate for the tabs provide a rigid, secure, truss-type attachment so that there is no movement of the tubes when faceplate distorts over time. The attenuation of the glass fibers is conducted by mechanical means through winding or chopping. In winding, the fibers are grouped into a strand and wound onto a forming tube situated on a rotating mandrel of a winding apparatus. Any other method of forming and attenuating hollow fibers as known by those skilled in the art can also be used. As the fibers are attenuated at speeds on the order of around 500 to around 30,000 ft/min. into ambient temperature air, they are cooled, and they can be treated with water or cooled air for additional cooling. The hollow glass fibers are collected separately or are gathered into one or more strands, usually by means of a gathering shoe. The fibers or strands are wound onto a rotating drum-type winder having a forming tube to produce a forming package. The collet on which the forming package rides usually rotates at high speeds to collect the strand or strands into the forming package. such speeds can be upward of 6,000 revolutions per minute which continues until the winder is slowed to a stop and a forming package is removed. An example of the gathering and collecting of the glass fibers into a forming package is disclosed in U.S. Pat. No. 4,071,339 (Griffiths) and U.S. Pat. No. 4,049,411 (Long and Dent) where attenuation speeds of from about 2,000 to 20,000 feet per minute are achieved; both patents are hereby incorporated by reference.

It is believed without limiting the present invention, that the fast attentuation speeds assist in providing an open glass structure in the fiber to facilitate extraction of acid and/or water extractable components. Also, it is believed that rapid cooling of the fibers assists in producing an open network structure which allows leachable components to be extracted in reasonable time periods.

The strands of the hollow glass fibers can comprise any number of fibers known to those skilled in the art. The proper combination of bushing tip size and attenuation speed results in hollow fibers with diameters in the range from 1 to around 250 microns (micrometers or um) and preferably from 1 to around 80 microns. Fibers with diameters larger than around 200 to 250 microns become increasingly difficult to wind. The fibers can have a K factor of up to around 0.96 but preferably in the range of around 0.2 up to about 0.96. Best results are obtained when the hollowness of the glass fiber comprises around 10 to around 80 percent of the volume of the glass fibers. Leached fibers having more than 80 percent of their volume that is hollow can be unstable because of thin walls Finer fibers with outer diameters of less than 40 microns also are subject to such limitations on volume percentages of hollowness. Preferably, the hollowness is found in such a manner that the wall thickness is in the range of around 1 to around 30 microns and preferably from 1 to around 10 and most preferably around 1 to around 5 microns. If the wall thickness is too large, the rate in the subsequent leaching step will slow dramatically because of both the larger size and slower cooling rates during the formation of the thicker-walled fibers.

The hollow, non-phase-separated glass fibers and/or strands that are collected into the forms of multilayered packages, either forming packages or roving packages, or into the forms of chopped fibers or strands, chopped or continuous fiberous or strand mats or batts are treated for pore generation. The continuous fibers or strands may be removed from the collection packages by cutting transverse to the package or parallel with the axis of the package or by rewinding onto larger diameter drums or can remain in the package, mat, or batt form for the generation of pores. Preferably, the strands are cut from one or more multilayered packages by making one or more transverse cuts through the layers of the package. The length of the cut, hollow, glass fibers can be varied by varying the diameter of the forming package during winding of the hollow glass fibers or by rewinding the hollow glass fibers from the forming package onto a smaller or larger diameter package. The many layers of the hollow glass fibers which are removed from the package can be laid flat on a supporting surface. The supporting surface can be a porous support, fiberous mat, plate or tray or moving conveyor belt. Generally, the discrete lengths of hollow glass fibers obtained by this approach can range from about 1 inch to around 20 feet. Any other method known to those skilled in the art for removing the glass fibers from the multilayered package can be employed. For example, the fibers can be unwound from the package and disposed as chopped strand or continuous strand onto another supporting surface or holder or rotating drum, like one with a diameter or 4 feet or 20 feet. Preferably, the discrete lengths of glass fibers can range from about 0.25 inch (0.64 cm) to around 70 inches (180 cm) but most preferably only up to around 36 inches (91.44 cm).

Before the pores are generated in the hollow glass fibers as fibers or strands through extraction, any sizing composition present on the fibers can be removed through a solvent wash such as a water wash to remove a water soluble sizing composition. Preferably, any sizing composition that is present is not removed from the glass fibers.

The leaching to generate pores can be accomplished by several routes, depending upon whether the glass fiber composition has acid or water soluble extractables. The pores that are generated should have a diameter across some portion of the opening of the pore, whether the pore is circular, elliptical, cylindrical or asymmetrical in shape, to yield the desired mean pore diameter. The mean pore diameter of the pores can have a broad or narrow distribution. The generation of pores from the single-phase and the phase-separable but non-phase-separated glass fibers without heat treatment depends on at least the 15 weight percent extractables being present in the glass fiber composition. Also, the wall thickness is preferably less than around 50 microns. Whether the acid and/or water leaching routes accomplish pore generation depends on whether the at least 15 weight percent extractables are acid or water soluble. Without heat treatment, the pores are generated by water and/or acid leaching for the glass fibers having the higher boron concentrations or having alkali metal oxide and by acid leaching for fibers with lower amounts of these materials. Hollow fibers having around greater than 45 weight percent boron-containing or alkali metal oxide-containing extractables can be made porous through water leaching. Also any of the phase-separable glass fibers yield porous fibers on water leaching followed by acid leaching.

The acid and/or water leaching can be conducted at a temperature ranging from sub-ambient to an elevated temperature up to the boiling point of the acid or water. Preferably the temperature is in the range of ambient to around 95° C. The acid is any organic acid or any inorganic acid other than hydrofluoric acid but also can be any preconditioned variation of such organic or inorganic acid. The concentrations of the acids can be in the range of around 0.1 Normal to 12 Normal for an acid having a pKa similar to hydrochloric acid. Acids with lower pka's can be used in more dilute solutions and acids with higher pKa's can be used in higher concentrations. Also the water and/or acid leaching solution may be preconditioned to have ions to reduce stress cracking occurrences. For example, ions of an alkali metal borate solution are useful as are ions obtained from leaching leachable glasses of any shape with reasonable surface areas for periods of time to provide sufficient quantities of ions. The time of leaching depends on the composition, the temperature of leaching and the concentration of the acid. Generally, the time is as short as around 5 minutes for the water or acid leaching of glass fibers with high concentrations of boron-containing extracables. The time is also as long as around 24 hours to a month or longer for the E-glass or 621-glass compositions. Maintenance of the concentration of the acid in a low acid pH range may assist in providing favorable leaching kinetics to result in a complete or near complete leaching reaction. Also, it is preferred in leaching the hollow glass fibers to seal the ends of the fibers with an acid resistant polymer. This permits leaching only from the exterior surface of one or more fibers. This is helpful in those situations where it would be difficult to remove the acid from the lumen after leaching. The continued presence of the acid might result in unwanted deposits in the lumen.

The hollow glass fibers with higher amounts of extracables are water-leached as the sole leaching step, or water leached, followed by an acid leach. In the water leach, the glass fibers are immersed in a water bath for a sufficient period of time, at a sufficient temperature to remove a substantial amount, if not all, of the water soluble boron-containing compounds in the glass fibers. The glass fibers are submerged in the water when the water is cool, and the temperature of the water is increased to an elevated temperature preferably around 80 to 100° C., most preferably around 95° C., for 1 to about 24 hours, preferably 3 hours. When the water leaching step is performed, it can be done in a vessel that accommodates agitation during leaching. If the temperature of the water bath falls below 80° C., there is less thorough leaching and there must be a substantial increase in the leaching time. The time of leaching depends on the temperature of the bath and size of the fiber being treated. It is preferable to keep the fibers aligned during the leaching process, by immobilization, usually by gluing the fibers on a porous backing. In the alternative, a rod can be placed perpendicular to the long axis of the fibers arranged in side-by-side relationship to hold them stationary. The volume ratio of water to glass fibers in the leaching bath can be about 2 to around 50 volumes of water to one volume of glass fibers. Low water to glass fiber volume ratios slow the leaching process while higher volume ratios serve no particular advantage.

After water leaching, or for acid leaching as the sole leaching step the glass fibers are placed in a similar vessel to that described for water-leaching. Acid leaching is conducted in the aforedescribed manner but more preferably with a preconditioned acid solution, such as 0.1 to about 6 Normal, preferably, about 3 to 4 Normal hydrochloric acid, at temperatures around 50° C. to 100° C., preferably 60° C., for about 10 minute to about 72 hours, preferably about 24 to about 48 hours for the preferred composition and size of fiber. In the acid leach, the glass fibers are immersed in the acid bath for a sufficient period of time, at a sufficient temperature to remove a substantial amount, if not all, of the acid soluble compounds in the glass fibers. The glass fibers can be submerged in the acid when the acid is cool and the temperature of the acid is increased to the elevated temperature, or can be submerged in acid at an elevated temperature. Nonexclusive examples of other suitable dilute solutions of acids include sulfuric and nitric acid, or organic acids such as oxalic acid. The volume ratio of acid to glass fibers in the acid leaching step can be about 1 to about 2500 or more volumes of acid to one volume of glass fibers, and this will vary somewhat with the normality of the acid. Higher volume ratios can be used in continuous or batch operations, where the acid is reused. The glass fibers are removed from the acid leaching solution, water washed to a pH of around 5 to neutral in the wash water after which the fibers are dried, preferably by air drying at around ambient to elevated temperatures for around 10 minutes to about 24 hours or more. Also, the fibers may be dried after air drying at elevated temperatures up to 200° C. or more but at temperatures less than those that would detrimentally affect the pores of the fibers.

The resulting porous fibers have a mean pore diameter that can be controlled to be in the range of greater than 0 to about 50 angstroms from the various aforementioned compositions and extraction operations. The lengths vary from long chopped fibers of 1 inch to 20 feet to near continuous fibers. The porous fibers have a pore volume in the range of about 0.15 to about 1, preferably 0.15 to 0.75 cc/gm and fiber diameters from, most preferably, about 10 microns to about 70 microns. The pore diameter is in the range of around 1 to around 50 angstroms, with a predominant percentage of pore volume comprised of average pore diameters of around 20 angstroms or less.

The hollow, porous, silica-rich fibers of the present invention can be used for gas separations in any gas separating apparatus known to those skilled in the art. For example, the gas separation apparatus utilized by those skilled in the art for separating gases with the use of hollow polymeric fibers can also be used with the porous, hollow, silica-rich fibers of the present invention. Any of these apparatus that provide contact between a gaseous mixture and either the exterior surface or the lumen of at least one of the hollow, porous, silica-rich fibers and that provide for separate removal of the gaseous mixture and the permeate (separated gas) can be used. Removal of the permeate is from the opposite side of the fiber from which the gaseous mixture contacted the hollow, porous fiber. An example of an apparatus that can be used is that shown in the article entitled "Helium and Diffusion Separation", by K. B. McAfee, Jr., Bell Laboratories Record, Vol. 39, pg, 358, Oct., 1961, hereby incorporated by reference. Nonexclusive example of gases that can be separated from gaseous mixtures include such permanent gases as: helium from natural gas or a 50/50 helium methane mixture; oxygen from an oxygen/nitrogen mixture, carbon dioxide from a carbon dioxide/methane mixture; oxygen from an oxygen/chlorine mixture; nitrogen from methane or natural gas; and acid gases from gaseous mixtures containing same. Gas separations with the porous hollow fibers occur at temperatures from around ambient to elevated temperatures. The upper limit of the temperature depends on the decomposition temperature of any organic resin, if present, with fibers, for instance, and resin end-seal.

PREFERRED EMBODIMENT OF THE INVENTION

The glass forming, fiberizable, pore generating batch composition is formulated by back calculations to result in hollow glass fiber composition that is not phase-separated before leaching of the extractable components. It is also preferred that the glass fibers have zirconium oxide or titanium oxide balanced with some aluminum oxide in an alkali metal borosilicate fiber glass composition to result in porous fibers with good alkaline tolerance.

The batch for forming glass fibers most preferably provides hollow fibers with a phase-separable glass composition, but that is formed so it is not phase-separated. The hollow glass fibers are formed by melting the batch at about 2600° F. (1427° C.) for around 3 hours and conditioning the melt for around one hour at 2600° F. (1427° C.), and mechanically attenuating the hollow glass fibers into air at ambient temperatures from a single-tip hollow fiber bushing melter, preferably an extended tip or a flared tip bushing. The air flow to the hollow fiber bushing is satisfactory to result in the desired K factor of around 0.2 to around 0.9. For a single-tip bushing the air flow usually is in the range of greater than 0 to about $1\times10^{-4}$ cfm (cubic feet per minute). The attenuation speeds are preferably from around 1,500 to around 6,000 feet/min. or more. The hollow fibers formed with good concentricity to have a diameter in the range of about 3 microns to about 100 microns and most preferably about 10 microns to about 70 microns and to have a wall thickness of around 1 to about 30 microns most preferably 1 to 5 microns. The hollow glass fibers preferably are formed with the application of an aqueous chemical treating composition (sizing). Preferably the size has a substantial amount of water (deionized) and a polyurethane film forming polymeric emulsion in an effective film forming amount, polyoxyalkylene polyol with a molecular weight of around 7,000 glass fiber wet lubricant in such an effective amount, a silylated polyether lubricant, in an effective lubricating and coupling amount and a mixture of ureido organosilane and epoxy organosilane coupling agents in effective coupling agent amounts. The fiber is wound into a cylindrical forming package having porous substrate secured around the circumference of the forming tube as disclosed in U.S. Pat. No. 4,689,255, hereby incorporated by reference.

The completed forming package has the fibers glued to the substrate, and the fibers and substrate are cut parallel to the longitudinal axis of the package. All of the layers of glass fibers with the substrate can be removed from the package. These fibers with the substrate are laid straight on a support in any suitable container for holding solids and fluids, where the fibers usually have a discrete length of about 12 inches (30.5 cm).

For acid leaching the non-phase-separated, hollow glass fibers are end-sealed with silicone rubber thinned in toluene and air cured for around 24 hours to prevent precipitate formation in their lumens. Alternatively, the fibers could be heat-sealed or end-sealed with epoxy resin or other suitable material. A plurality of the blankets (layers of fibers and substrate cut from the winder) is contained in a suitable rack to hold the fibers in the acid while allowing for agitation of the acid solution. The rack is placed in an acid solution in an appropriate vessel. The fibers are leached with agitation, by a preconditioned acid solution of about 3 to 4 Normal hydrochloric acid, at temperatures around 50° C. to 70° C., for about 8 to about 96 hours, and most preferably about 12 to about 48 hours. Preconditioning of the acid solution involves leaching already formed glass fibers in an amount in the range of greater than 0.1 to over 100 gm of glass/liter of acid and most preferably around 10 to 30 gm/liter with the concentrated acid. Performance of preconditioning is at a temperature in the range of around 50° to 70° C. for a time of around 6 to 48 hours. When larger amounts of glass fibers are used, shorter times are employable. The preconditioned acid is separated from any remaining leached glass fibers, and the preconditioned acid with a normality of around 3 to 4 is used to leach hollow glass fibers. In a continuous process the continuous performance of preconditioning of the acid may occur automatically after initial preconditioning. In such a process, preconditioning can be performed at the beginning of the process and that preconditioned acid can be subsequently recycled for subsequent leaching operations.

In the acid leach, the hollow glass fibers are immersed in the preconditioned 3 to 4 normal hydrochloric acid bath for a sufficient period of time, at the elevated temperature of acid preconditioning to remove a substantial amount, if not all, of the acid soluble compounds in the glass fibers. The volume ratio of acid to glass fibers in the acid leaching step is about 100 to about 2500 volumes of acid to about one volume of hollow glass fibers but this ratio will vary somewhat with the normality of the acid. The hollow, silica-rich fibers are removed from the acid leaching solution, and they are water washed to a pH of around 5. Afterwards, the fibers are dried, preferably by air drying at ambient temperature for around 8 ours to about 24 hours. In addition, the fibers can be further dried by techniques known to those skilled in the art to result in uniform drying.

A plurality of the porous, hollow, silica-rich fibers are placed in a pressurizable container having an inlet and two outlets. One end of each fiber at the same side of the container is sealed. The unsealed side of each fiber is located in one of the outlets of the container. This allows for flow of the gaseous mixture into the container so that the permeate passes through the exits the porous hollow fibers and exits the container via the appropriate outlet of the container. The unseparated gaseous mixture exits the container at the other outlet and can be recirculated to the inlet.

The invention along with alternative embodiments are illustrated further in the following examples.

Table 1 presents 11 glass fiber compositions useful in producing leachable glass fibers for gas separation membranes.

Compositions of examples 1, 2, 6, and 11 from Table 1 were formed into porous, hollow, fiber membranes according to the conditions given in Table 2. Compositions of Example 11 were formed under two different sets of conditions A and B. All of the fibers were formed without any sizing composition, and the fibers were leached without any prior heat treatment subsequent to their formation.

TABLE 2

FORMATION OF HOLLOW POROUS FIBERS

| Examples from Table 1 | 1 | 6 | 2 | 11 A | 11 B |
|---|---|---|---|---|---|
| Forming Conditions: | | | | | |
| Attenuation Speed (ft/min) | 3240 | 2115 | 3800 | 3200 | 3750 |
| Rushing temperature (°F.)/(°C.) | 2246/1230 | 2101/1149 | 2095/1146 | 2150/1177 | 2155/1179 |
| Air Tip Pressure (inches of $H_2O$) | 3.9 | 8.8 | 5.4 | 4 | 5.75 |
| OD/ID/Wall Thickness (microns) | 40/30/5 | 20/10/15 | 40/35/5 | 45/35/5 | — |
| Leaching Conditions: | | | | | |
| Acid/Normality | HCl/3 | HCl/3 | HCl/3 | HCl/4 | HCl/4 |
| Acid Preconditioning | None | None | None | 10 gm/L* | 12 gm/L* |
| Temperature/time (°C./hr) | 55/24 | 90/1 | 55/1 | 60/23 | 60/17 |
| Glass Weight/Acid Volume (gm/ml) | 0.5/100 | | 2/1000 | 1/1000 | 1/1000 |

*Preconditioning was performed by treating the given weight of glass fibers with the same composition as fibers of 11A and B with the 4N HCl.

The hollow, porous fibers of Example 2 were prepared according to the conditions listed in Table 2 in the below-indicated manner, and examples 1, 6, 11A and 11B were prepared by a similar method.

The hollow glass fibers were prepared from a single tip bushing designed with an extended air tube. The fibers were wound directly onto a cardboard forming tube. The air tip pressure from the extended air tube was 5.4 inches of water. A 6 inch long piece of non-heat-treated glass fibers (approximately 1 gram in weight) was leached for 30 minutes in 1,000 ml of the designated acid of the designated normality contained in a Pyrex dish and held at a temperature of 55° C. for one hour The sample is then rinsed repeatedly with deionized water.

Samples of leached hollow glass fibers of compositions 1 and 6 of Table 1 were analyzed by the nitrogen absorption method using the Micromeritics Instrument Corporation Model Digisorb 2600. The analyses showed that the sample 6 hollow porous glass fibers had higher pore volume (Vp) than that of hollow porous sample of Example 1. This leads to the conclusion that the fiber pore structure of Example 6 was as fine or even finer than that of Example 1. The results of the two leached materials were:

TABLE 1

LEACHABLE FIBER GLASS COMPOSITION FOR MEMBRANES

| Examples Oxide | 1 | 2 | 3 | 4 | 5 | 6 | 7 | 8 | 9 | 10 | 11 |
|---|---|---|---|---|---|---|---|---|---|---|---|
| $SiO_2$ | 55.1 | 59.0 | 65.7 | 63.7 | 39.8 | 54.5 | 52.5 | 39.8 | 52.4 | 68.6 | 59.4 |
| $B_2O_3$ | 5.47 | 27.6 | 21.7 | 19.0 | 47.1 | 34.2 | 36.2 | 50.7 | 36.1 | 24.8 | 27.0 |
| $Na_2O$ | 0.76 | 8.5 | 8.3 | 10.3 | 9.0 | 7.0 | 7.0 | 9.4 | 7.0 | 5.0 | 8.8 |
| $ZrO_2$ | 0.035 | 3.3 | 2.0 | 2.0 | 3.0 | 3.0 | 3.0 | — | 3.0 | — | 3.6 |
| $Al_2O_3$ | 13.95 | 1.2 | 2.2 | 2.2 | 1.1 | 1.1 | 1.1 | — | 1.1 | 1.5 | 0.8 |
| CaO | 22.5 | — | — | 2.7 | — | — | — | — | — | — | — |
| $Fe_2O_3$ | 0.19 | 0.3 | — | — | — | — | — | — | 0.3 | 0.3 | 0.3 |
| Trace Materials[1] | 1.78 | 0.1 | 0.1 | 0.1 | — | 0.2 | 0.2 | 0.1 | 0.1 | — | 0.1 |
| % Leachables | (Around) 44 | 36.1 | 32.2 | 34.0 | 57.2 | 42.3 | 44.3 | 60.1 | 44.6 | 31.6 | 35.9 |

[1]Trace materials include such oxides as: MgO, $TiO_2$, $K_2O$, $Cr_2O_3$, SrO and BaO and fluorine

| Hollow-Porous Fiber Composition | Sw (m²/gm) L/BET | Vp (cc/gm) | d̄ (Å) L/BET | % vol in pores 18Å |
| --- | --- | --- | --- | --- |
| Example 1 of Table 1 | 615/443 | 0.223 | 14.5/20.2 | 81.0 |
| Example 6 of Table 1 | 788/585 | 0.291 | 14.8/19.9 | 95.4 |

The calculated average pore diameters by two different methods are very nearly equal for the two samples. The pore size distributions were also used to calculate the percentage of pore volume due to pores smaller than 18Å. These pore sizes cannot be measured directly in amorphous materials by any method known, however the volume of the pores larger than 18Å can be estimated from such distributions and subtracted from the total pore volume. The above-presented values indicate that a higher percentage of pores in fibers of Example 6 fall into the range of less than 18Å than do those of fibers of Example 1. This is also seen in FIG. 1 by comparing the distribution of curve A for a composition of Example 6 to that of that of curve B for a composition of Example 1. Although the porous fibers of Example 1 have a lower Vp, more pore volume is in the range of diameters greater than 18Å but still less than +Å. In FIG. 1 the bar section of the graph indicates experimentally determined or calculated values, while the curve portions for both curves A and B are extrapolations based on mathematical calculations based on the remaining pore volumes from the comparable bar section of the graph. The fiber with the composition of Example 1 and Curve B is a single-phase, non-phase-separable composition. The fiber of Example 6 and Curve A is a phase-separable composition. Since the phase-separable fiber has more pore volume comprised of pores with diameters less than 18Å than the non-phase separable fiber, the conclusion is that the phase-separable fiber was non-phase-separated. Leaching of a composition that is phase- separated results in the production of pores with larger diameters as opposed to those of less than 18Å in diameter.

In the above-presented data, the following applies:

(1) Pore size distributions were calculated by a Micromeritics method which incorporates the method of Barrett, Joyner, and Halenda. (Barrett, E. P.; Joyner, L. G.; Halenda, P. P. *J. Am. Chem. Soc.* 1951, 73, pp. 373–380.

(2) Total pore volume (Tp) is also calculated by the Micromeritics method and is reported as the Liquid Equivalent of the Maximum Volume Sorbed. The calculation assumes complete pore filling at pressures very close to the saturation pressure as in Orr, Clyde Jr.; Dallavalle, J. M., *Fine Particle Measurement*, Macmillan Co., N.Y. (1959).

(3) Specific surfaces (sw), also called surface area, is determined in two ways: (A) SW(L)—the method of Langmuir, Jelinek, Z. K., "Particle Size Analysis"; Halsted Press: New York, 1970, pp. 134–135; (B) SW(BET)—the method of Brunauer, S.; Emmett, P. H.; Teller, E.; *J. Am. Chem. Soc.* 1938, 60, pp. 309–319.

(4) Average pore diameter (d̄) is calculated by assuming cylindrical, non-intersecting pores and using the relationship between Vp and specific surface (Sw) for such shapes. See Orr, Clyde, Jr.; Dallavalle, J. M.; *Fine Particle Measurement*, Macmillan Co., N.Y., (1959).

A number of single fiber gas separation cells were constructed for the fibers of Examples 1 and 2 of Table 2. The capillary test cells were prepared by potting the single porous hollow fiber in the cell which was constructed with a ⅛ inch stainless steel tube approximately 2 inches (51 mm) long. An epoxy seal covered the fiber end internal to the cell and filling a short length, roughly about 0.5 mm of the fiber lumen to prevent gas from entering the end of the fiber. A second epoxy seal filled the space (except for a small vent fiber) between the wall of the steel capillary tube and the hollow fiber for a length of approximately 10 millimeters to prevent escape of the gaseous mixture. When the capillary inlet is connected by fittings to a source of pressurized gas feed mixture, the components must permeate the exposed walls of the hollow porous fiber (approximately 1 inch long) and travel the length of the lumen to escape as permeate flows from the exit end of the hollow porous silica-rich fiber. The capillary cell is oriented vertically with the fiber exit at the upper end so that a collection cell filled with water can be placed over the extended tip of the porous hollow fiber. The collection cell was a glass capillary tube having a 6 mm outside diameter and a 4 mm inner diameter which was sealed at one end and open at the other. The glass capillary was filled to overflowing with water so that the surface tension of the liquid allowed the glass capillary tube to be turned upside down over the extended hollow fiber from the capillary cell without any of the water dripping out. The permeate gas from the single fiber capillary test cell allowed for bubbling of permeate gas out of the exit end of the porous hollow fiber where the gas collected at the top end of the collection cell has a large bubble. The volumetric rate of water displacement was equated to permeate flux and a gas tight syringe was used to transfer a sample of the gas for analysis by gas chromatography. The permeability factor was calculated according to the formula P/L=flux (cm³/second)/(fiber area)(cm²)×pressure drop (cm mercury). The selectivity is the ratio of the permeability of the fastest permeating gas to that of the slower permeating gas.

Table 3 presents the data of the selectivities and permeabilities obtained for various gas separations for the porous hollow fibers of Examples 1, 2 and 11 (A & B). Values for Examples 11A and B were generated by similar, more sophisticated cells and method. The feed pressure for these tests was 300 psig. Also Table 3 presents comparative published data for gas separations by a commercial polysulfone fiber.

TABLE 3
SELECTIVITIES AND PERMEABILITY FOR POROUS HOLLOW FIBERS

| MEMBRANE MATERIAL | GAS MIXTURE | TEMP(°C.) | SELECTIVITY (Pfast/Pslow) actual | SELECTIVITY (Pfast/Pslow) Knudsen predict | ESTIMATED PERMEABILITY FACTOR (P/1) ($cm^3 \times 10^{-6}$)/($cm^2 \times sec \times cm\ Hg$) | |
|---|---|---|---|---|---|---|
| (POLYSULFONE) AS DESCRIBED IN U.S. PAT. NO. 4,472,175 AT TABLE 12 | $H_2/CH_4$ | | 69–80 | 2.8 | $H_2$ | 57–75 |
| | $O_2/N_2$ | | 4.5 | 0.94 | $O_2$ | 6–9 |
| " | $CO_2/CH_4$ | | 30 | 1.7 | $CO_2$ | 24 |
| Example 2 from Table 2 | $He/CH_4$ 50/50 | Room 30 | 555 | 2.0 | He | 30 |
| | $O_2/N_2$ 22/78 | Room 30 | 3.2 | 0.94 | $O_2$ | 0.68 |
| Example 1 from Table 2 | $He/CH_4$ 50/50 | Room 30 | 345 | 2.0 | He | 36 |
| | $O_2/N_2$ 22/78 | Room 30 | 3.9 | 0.94 | $O_2$ | 0.70 |
| Example 11 (A) Table 2 | $N_2/CH_4$ 15/85 | 30 70 | 5.2 4.6 | 0.76 | $N_2$ $N_2$ | 0.35 2.8 |
| | $CO_2/CH_4$ 50/50 | 70 | 164 | 1.7 | $CO_2$ | 48 |
| Example 11 (B) Table 2 | $N_2/CH_4$ | 30 70 | 7.1 5.8 | 0.76 | $N_2$ $N_2$ | 0.12 1.1 |
| | $CO_2/CH_4$ | 30 70 | 425 238 | 1.7 | $CO_2$ $CO_2$ | 5.4 31 | the porous glass fibers for the $N_2/CH_4$ separations were prepared by leaching the hollow glass fibers of Example 11A of Table 1 with 4 Normal, preconditioned hydrochloric acid at 60° C. for 23.2 hours and for glass fibers of Example 11B for 17.3 hours. After leaching, the fibers were rinsed in water and air dried.

In Table 3, the data were accumulated with a number of aforementioned single fiber capillary cells for each gas separation, and the average values are presented in Table 3. For example, the membrane material Example 2 from Table 2 in separating helium from the 50/50 mixture of helium and methane was tested in 6 single fiber capillary cells. The permeability factor P/L was calculated as follows:

P/L = permeate flux [$cm^3$ (STP)/second]/membrane area ($cm^2$)×delta p(cm Hg)

for He:
delta p = partial pressure of Helium in feed minus partial pressure of Helium in permeate
delta p = [(315 psia) (0.5) − (15psia)(0.998)]76 cm Hg/15 psia = 722 cm Hg
membrane area = 2(pi)(average radius)(fiber length)
membrane area = 2(pi)(17.5×10$^{-4}$cm)(3.8 cm) = 0.042 $cm^2$
permeate flux = (0.998)[54 microliter (STP)/minute]×$cm^3$/1000 microliters × minutes/b 60 seconds = 8.98×10$^{-4}$$cm^3$(STP)/$second$
Permeability factor (P/L) = (8.98×10$^{-4}$$cm^3$(STP)/seconds)/(0.042 $cm^2$)(722 cm Hg)
Permeability factor (P/L) × 3.0×10$^{-5}$ $cm^3$(STP)/($cm^2$) (sec)(cmHg)
for $CH_4$
By the same calculation, P/L for $CH_4$ is equal to 5.4×10$^{-8}$ $cm^3$(STP)/($cm^2$)(sec)(cmHg)

alpha He/$Ch_4$ = selectivity = P/L-(He)/P/L($CH_4$) = 3.0×10$^{-5}$/5.4×10$^{-8}$ = 555

In a similar manner, Example 2 from Table 2 was used to separate oxygen from nitrogen in three single fiber capillary cells and the average values are presented in Table 3. Also Example 1 of Table 2 (621-glass) was tested in several single fiber cells for the separation of helium from a gas mixture of helium and methane and oxygen from a gas mixture of oxygen and nitrogen mixture and the results are presented in Table 3.

For all of the separations of Table 3, the Knudsen separation factor was calculated based on the molecular weights of the gases being separated.

At the top of Table 3, there are presented published results for gas separations of a commercial polysulfone fiber.

From Table 3, the results show very good selectivity in the separation of the glass with a very good permeability factor, in some cases, better than the polysulfone by orders of magnitude and in other cases, comparable to the polysulfone membrane.

In accordance with the aforedescribed disclosure of hollow, porous, high silica fibers with fine pores and thin walls for separating gases from gaseous mixtures, we claim the following as our invention:

1. A process of enriching at least one gas from a mixture of gases utilizing a porous, silica-rich membrane material comprising:
   using at least one hollow, porous, silica-rich, inorganic hydrophilic fiber that is non-crystalline as a porous separation membrane, where the fiber has pore sizes within the range of 1 to around 50 Angstroms in diameter and has a predominant percentage of pore volume comprised of average pore diameters of around 25 Angstroms or less and has a fiber diameter in the range of around 1 to 250 microns and has a wall thickness in the range of around 1 to 50 microns, wherein the silica-rich fiber results from extracting at least 15 weight percent extractable components selected from the group consisting of: (a) components extractable with acids, where the acids are other than hydrofluoric acid, (b) water extractable components, or (c) a mixture thereof, from non-phase-separated, hollow glass fibers formed by attenuation from melt at speeds in the range of at least 500 ft/min to around 30,000 ft/min, where the non-phase-separated glass fibers have a composition selected from the group consisting of: (a) leachable, single-phase, fiberizable, glass compositions; and (b) leachable, phase-separable but non-phase-separated fiberizable silica-containing glass compositions, both having at least 15 to about 60 weight percent components selected from the group consisting of components soluble in acids, where the acids are other than hydrofluoric acid, water soluble components, and mixtures thereof whereby membrane performance in terms of selectivities and permeabilities in gas enrichment can be enhanced over that performance predicted from Knudsen diffusion calculations.

2. Process of claim 1, wherein acid gases are removed from acid gaseous containing gaseous mixtures.

3. Process of claim 1, wherein helium is separated from methane and/or natural gas.

4. Process of claim 1, wherein oxygen is separated from a gaseous mixture selected from the group consisting of oxygen and nitrogen, air, carbon dioxide containing air and oxygen and chlorine gaseous mixtures.

5. Process of claim 1, wherein a plurality of fibers are used.

6. Process of claim 1, wherein the porous, silica-rich fibers result from non-heat-treated, hollow glass fibers that are non-phase-separated.

7. Process of claim 1, wherein nitrogen is separated from methane and/or natural gas.

8. Article of claim 1, wherein the non-phase-separated hollow glass fibers have a composition that is selected from the group consisting of E-glass, and 621-glass where the glass fibers are attenuated at a speed of around 1,500 to about 6,000 feet per minute, and where the glass fibers are leached without being heat treated.

9. Article of claim 1, wherein the non-phase-separated hollow glass fibers have a fiberizable composition having an amount in weight percent of silica from 40 to 56 and having an amount of a tetravalent oxide of zirconium, titanium, or hafnium of up to 20 weight percent and acid extractable components selected from the group consisting of: boron oxide from 5 to 13 weight percent and one or more of: alkali metal oxides, alkaline earth metal oxides, trivalent oxides, $SnO_2$ and $P_2O_5$ where the total amount of the acid extractable components gives a volume percent of the acid extractables in the glass fibers in the range of at least 15 to 60 volume percent, and wherein the hollow glass fibers are non-heat-treated and whereby the extraction of the hollow glass fibers results in hollow porous, silica-rich fibers.

10. Process of claim 1, wherein the hollow glass fibers are attenuated from melt without application of a chemical sizing composition.

11. Process of claim 1, wherein using the porous silica-rich membrane material includes:
contacting the gaseous mixture with one surface of the hollow, porous, silica-rich fiber at temperature in the range of below ambient to elevated temperatures and at a pressure in the range of about 1 to 5,000 psi; and
removing from the vicinity of the opposite surface of the hollow porous silica-rich fiber from that of the contact surface, a produce enriched in at least one gas of said gaseous mixture.

12. Process of claim 11, wherein the product removed is the permeate gas.

13. Process of claim 11, wherein the product removed is the rejected gas separated from the permeate gas.

14. Process of claim 11, wherein the product gas removed is both the permeate gas, separated from a rejected gas and removed from one side of the fiber, and the rejected gas removed from the other side of the fiber.

15. A gas separation material, comprising:
at least one hollow, porous, non-crystalline, inorganic, silica-rich fiber as a porous separation membrane having pore sizes within the range of about 1 to around 50 Angstroms in diameter, and a predominant percentage of pore volume comprised of average pore diameters of around 25 Angstroms or less and fiber diameters in the range of 1 to around 25 micrometers, and a fiber wall thickness in the range of around 1 to around 50 micrometers, wherein the silica-rich fiber results from extracting extractable materials selected from the group consisting of acid and water extractable materials and mixtures thereof from non-phase separated, hollow glass fibers, formed by attenuation from melt at speeds in the range of at least 500 ft/min to around 30,000 ft/min, where the non-phase-separated glass fibers have a composition selected from the group consisting of (a) leachable, single-phase compositions, and (b) leachable, phase-separable fiberizable silica-containing glass compositions, both having at least 20 to about 60 weight percent components soluble in acids, where the acids are other than hydrofluoric acid, and/or water soluble components, whereby membrane performance in terms of selectivities and permeabilities in gas separations can be enriched over that performance predicted from Knudsen diffusion calculations.

16. Article of claim 15, wherein the leachable, silicate glass compositions are selected from the group consisting of phase-separable borosilicate glass fibers having one or more oxides of a metal from Group IVB of the Periodic Table, phase-separable borosilicate glass compositions with an amount of boron oxide in the range from around 5 to around 60 weight percent of the glass fibers, and alkali metal silicate glass compositions.

17. Article of claim 16, wherein the Group IVB metal oxide is zirconium.

18. Article of claim 15, wherein the pore volume of the hollow, porous, silica-rich fiber is in the range of around 0.15 up to around 1 cm$^3$ per gram.

19. Article of claim 15, wherein the fiber outer diameter is less than 100 microns (um).

20. Article of claim 15, wherein the fiber outer diameter is in the range selected from about 10 to about 70 microns (um).

21. Article of claim 15, wherein the fiber outer diameter is less than 50 microns (um).

22. Article of claim 15, wherein the attenuation speed of the hollow glass fibers is in the range of 1,000 ft/min to around 20,000 ft/min.

23. Article of claim 15, wherein the wall thickness of the hollow glass fibers is in the range of around 1 to 10 microns (um).

24. Article of claim 15, wherein the wall thickness of the hollow glass fibers is in the range of about 1 to about 5 microns (um).

25. Article of claim 15, wherein the inner diameter to outer diameter ratio of the hollow glass fibers is in the range of about 0.4 to about 0.96.

26. Article of claim 15, wherein the mean pore size is less than 30 Angstroms in diameter.

27. Article of claim 15, wherein the mean pore side is less than 20 Angstroms in diameter.

28. Article of claim 15, wherein the acid extractable components are selected from the group consisting of $P_2O_5$, $Al_2O_3$, $Fe_2O_3$, PbO, $Na_2O$, $SNO_2$, ZnO, CaO, MgO, $K_2O$, BaO, fluorine and $B_2O_3$ or mixtures thereof where the total acid extractable components are present in the range of around 15 to 60 weight percent of the glass fiber and where $B_2O_3$ is present as the predominant acid extractable component in the range of 5 to 60 weight percent.

29. Article of claim 15, wherein the hollow, porous fibers are produced from non-heat-treated, glass fibers that are non-phase-separated.

30. Article of claim 15, wherein the non-phase-separated hollow glass fibers have a composition that is selected from the group consisting of E-glass, and 621-glass where the glass fibers are attenuated at a speed of around 1,500 to 6,000 ft/min.

31. The gas separation material of claim 15, prepared from non-phase-separated, hollow glass fibers by acid leaching with agitation with an acid having a normality of around 3 to 4, at a temperature in the range of 50° C. to 70° C. for about 24 to about 48 hours to remove a substantial amount of the at least 20 weight percent acid soluble components to result in the pore volume in the range of about 0.15 to about 0.75 cc/gm.

32. Article of claim 15, wherein the non-phase-separated hollow glass fibers have a fiberizable composition having an amount in weight percent of silica from 40 to 56 and having an amount of tetravalent oxide of zirconium, titanium, or hafnium of up to 20 weight percent and acid extractable components selected from the group consisting of: boron oxide from 5 to 13 weight percent and one or more of: alkali metal oxides, alkaline earth metal oxides, trivalent oxides, $SnO_2$ and $P_2O_5$, where the total amount of said extractable components gives a volume percent of the acid extractables in the glass fibers in the range of at least 15 to 60 volume percent, and wherein the hollow glass fibers are non-heat-treated and whereby the extraction of the hollow glass fibers results in hollow porous, silica-rich fibers.

33. Article of claim 15, wherein the hollow glass fibers are devoid of the presence of a chemical sizing composition.

34. A gas separation material for enriching at least one gas from a gaseous mixture, comprising:

at least one hollow, porous, non-crystalline, inorganic, silica-rich fiber with pore sizes within the range of 1 to around 30 Angstroms in diameter and with a predominant percentage of pore volume comprised of average pore diameter of less than around 20 Angstroms in diameter and a fiber outer diameter in the range of around 4 microns (um) to 40 microns (um) and with a fiber wall thickness in the range of around 1 micron to 10 microns (um), and with an inner diameter to outer diameter ratio of around 0.4 to around 0.96 and where the silica-rich fibers result from extracting acid soluble components from the non-phase-separated, hollow glass fibers having a phase separable borosilicate glass fiber composition with one or more oxides of a metal of Group IVB of the Periodic Table, whereby membrane performance in terms of selectivities and permeabilities in gas separations can be enhanced over that performance predicted from Knudsen diffusion calculations.

35. Article of claim 34, wherein the hollow glass fibers are devoid of any chemical sizing composition.

36. A process for producing a gas enriching membrane, comprising:

(a) forming at least one non-phase-separated, hollow glass fiber having a composition selected from the group consisting of (a) extractable, single-phase silicates, and (2) extractable phase-separable silicates both having an amount of at least 20 weight percent extractables by acids other than hydrofluoric or phosphoric acid, extractables or water extractables of at least 15 weight percent, where the hollow glass fibers have an outer diameter in the range of 1 to 250 microns (um) and have a wall thickness in the range of around 1 to around 50 microns (um) and have an inner to outer diameter ratio in the range of 0.4 to 0.96 and where the fibers are attenuated (formed) at a speed in the range of 500 to 30,000 feet/min. with rapid cooling of the fibers, (b) leaching a non-heat-treated, hollow glass fiber to remove extractables selected from the group consisting of acid extractables soluble in acids that are acids other than hydrofluoric acid, and water soluble, and mixtures thereof to produce a porous, silica-rich, hollow fiber having pores with diameters from 1 to 50 Angstroms and with predominant percentage of the pore volume comprised of pores with an average diameter of around 20 Angstroms or less and with a pore volume in the range of around 0.15 to around 0.75 $cm^3$/gm, whereby membrane performance in terms of selectivities and permeabilities in gas separations can be enhanced over that performance predicted from Knudsen diffusion calculations.

37. Process of claim 36, wherein the non-phase-separated hollow glass fibers have a fiberizable composition having an amount in weight percent of silica from 40 to 56 and having an amount of a tetravalent oxide of zirconium, titanium, or hafnium of up to 20 weight percent and acid extractable components selected from the group consisting of: boron oxide from 5 to 13 weight percent and one or more of: alkali metal oxides, alkaline earth metal oxides, trivalent oxides, $SnO_2$, and $P_2O_5$ where the total amount of the acid extractable components gives a volume percent of the acid extractables in the glass fibers in the range of at least 15 to 60 volume percent, where the hollow glass fibers are leached without heat treating and whereby the extraction of the hollow glass fibers results in hollow porous, silica-rich fibers having a pore volume of around 0.15 to around 0.75 cubic centimeters per gram.

38. Process of claim 36, wherein the hollow glass fibers are attenuated without the application of a chemical sizing composition.

39. Process of claim 36, wherein the non-phase-separated hollow glass fibers have a composition that is selected from the group consisting of E-glass and 621-glass and where the glass fibers are attenuated at a speed of around 1,500 to 6,000 feet per minute, and where the glass fibers are leached without being heat treated.

* * * * *